Sept. 8, 1970 J. J. BUDY 3,528,100
ARC ESTABLISHING CIRCUIT
Filed Feb. 19, 1968

Inventor:
Joseph J. Budy
By: James E. Nilles
Attorney

United States Patent Office 3,528,100
Patented Sept. 8, 1970

3,528,100
ARC ESTABLISHING CIRCUIT
Joseph J. Budy, Menomonee Falls, Wis., assignor, by mesne assignments, to Chemetron Corporation, Chicago, Ill., a corporation of Delaware
Filed Feb. 19, 1968, Ser. No. 706,305
Int. Cl. B23k 9/10
U.S. Cl. 219—131
2 Claims

ABSTRACT OF THE DISCLOSURE

An arc welding circuit includes a three phase power transformer having a pair of in-phase secondaries, each connected in a delta configuration. A pair of full wave rectifiers is connected one to each of the secondaries and connected in parallel to welding terminals connected respectively to a work member and a consumable electrode. The first secondary is wound to provide a selected background voltage sufficient to maintain a previously established arc and is connected to the terminals in series with a blocking diode or other unidirectional current conductive means. The other secondary is wound to establish a preselected higher output voltage sufficient to establish and maintain the arc with substantial metal transfer from a consumable electrode and is connected in circuit in series with a silicon controlled rectifier. A separate turn-off silicon controlled rectifier is connected across the main rectifier in series with a capacitor to terminate conduction. The capacitor is interconnected to the incoming power supply through a charging circuit including a single phase transformer-rectifier unit. By controlled firing of the two controlled rectifiers, the high voltage supply is connected across the electrode and the work member to establish the arc and transfer metal.

BACKGROUND OF THE INVENTION

This invention relates to an arc establishing circuit and method and particularly to an arc welding circuit and method with controlled metal transfer from a consumable electrode.

In arc welding, an arc may be established between the work member and a consumable or nonconsumable electrode. In a nonconsumable electrode process, the arc generates a heat causing fusion of the work member. In consumable electrode arc welding processes, an electrode of indefinite length is continuously fed to the welding arc and work with the electrode metal being melted and fused with the work member. The development of arc welding has been accompanied with increasingly particular requirements or specifications with regard to the characteristic of the arc in order to produce satisfactory welds and a great number of different circuits, apparatus and processes have been suggested to control the arc characteristic for producing highly satisfactory welds. The particular conditions and characteristic of the arc will vary with the metals being welded, the electrode size and the like.

Generally, the consumable electrode processes may employ a pure spray transfer through the arc gap or an alternative process has been suggested employing a short circuiting of the arc by the consumable electrode or by the molten metal of the electrode.

In a consumable electrode process employing a continuous arc characteristic, it is highly desirable to provide a controlled heat input to minimize the flow of the molten weld metal particularly in out of position welding.

SUMMARY OF THE INVENTION

The present invention is particularly directed to an arc establishing circuit and method which is particularly adapted to formation of a highly stable and continuous welding arc with intermittent transfer of weld metal from a consumable electrode. Generally, in accordance with the present invention a dual power supply is connected across the consumable electrode and the work. A switching means is interconnected with the one power supply to selectively connect the high voltage supply and the low voltage supply across the electrode and the work with adjustable means to control the turn-on and the turn-off of the high voltage supply. The high voltage supply is sufficient to initially establish and maintain the arc with substantial metal transfer from the consumable electrode to the work. When the high voltage supply is removed, the low voltage supply maintains the previously established arc but with minimal metal transfer. During this latter period the weld metal is allowed to cool to thereby prevent run off. The low voltage supply thus maintains a continuous background voltage applied across the electrode and the work sufficient to maintain the arc. However, to establish the arc and operatively effect metal transfer, the high voltage supply must be applied to the arc. The background or low voltage supply is selected to maintain a desired arc characteristic with sufficient heat to prevent eventual short circuiting of the arc while maintaining controlled cooling of the weld metal. Generally, the present invention further includes means to control the pulse rate and/or "on" time of the high voltage supply. Increasing the pulse rate and/or increasing the "on" time of such pulses generally will increase the average heat introduced into the weld for any given pulse amplitude and background voltage.

The dual control permits relatively fine tuning of the arc characteristic in accordance with the external welding conditions such as the size or material of the work member as well as the size or material of the electrode wire. Thus for relatively thin material such as tubing, and out of position welding a relatively low pulse rate and short pulse time may be more advantageously employed to prevent burn through. Alternatively for heavier work and in position welding a substantially greater pulse rate and on time may be desired.

In a particularly novel and preferred construction, the arc establishing circuit includes a three phase power transformer having a pair of in-phase secondaries. A pair of full wave rectifiers are connected one to each of the secondaries to establish a pair of direct current voltage supplies. The outputs of the rectifiers are connected in parallel to output terminals for interconnection in a welding circuit and particularly to a work member and a consumable electrode. The first secondary is wound to provide a selected background voltage sufficient to maintain a previously established arc and is connected to the terminals in series with a blocking diode or other unidirectional current conductive means. The other secondary is wound to establish a preselected higher output voltage sufficient to establish and maintain the arc with substantial metal transfer from a consumable electrode and is connected to the output terminals in series with a main controlled rectifier or other triggered electronic switch means. A separate turn-off or commutating rectifier means is connected across the main rectifier to terminate conduction. By controlled firing of the controlled rectifiers, the high voltage supply is connected across the electrode and the work member with the higher voltage being interconnected to back bias the first supply circuit. The SCR is turned off to terminate a pulse by a commutating rectifier interconnected across the main rectifier in series with a commutating capacitor. The capacitor is interconnected to the incoming power supply through a charging circuit including a suitable transformer-rectifier means. A trigger circuit is connected to both of the controlled rectifiers for alternately firing of the main silicon controlled rectifiers to first complete the connection to the high voltage D.C. supply and to subsequently rapidly turn off the silicon controlled rectifier by discharging of the commutating capacitor to open such connection and terminate the pulse. Controlled firing of the rectifiers produces welding pulses to the arc superimposed upon the background voltage with the rate and width of the pulses controlling the arc welding characteristic.

The applicant has found that this invention provides a highly reliable, efficient and versatile control means for fine tuning of a welding arc characteristic and in particular for varying of the power input to the arc in accordance with the external conditions.

The drawings furnished herewith illustrates a preferred construction of the present invention in which the above advantages and features are disclosed as well as others which will be clear from the following description.

DESCRIPTION OF THE PREFERRED EMBODIMENT

Figure 1:
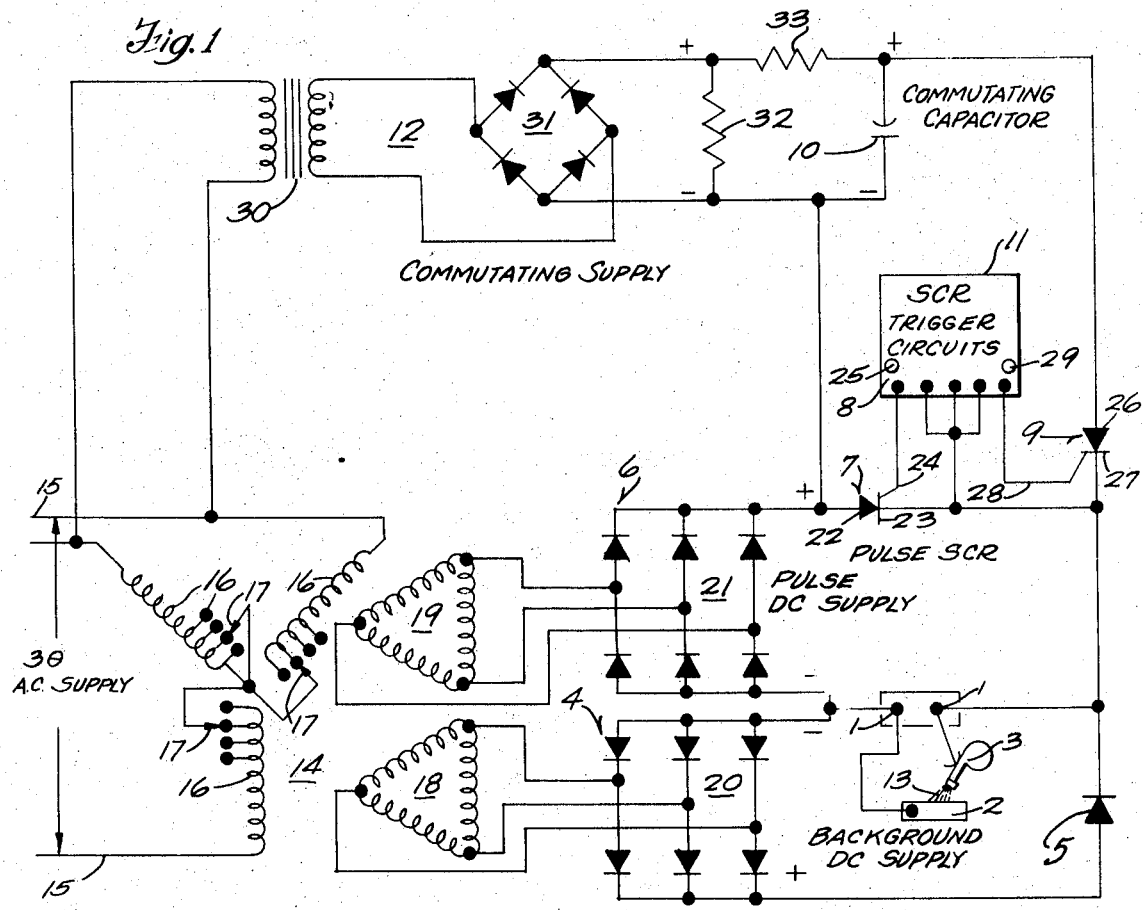
FIG. 1 is a schematic circuit diagram of an arc welding circuit constructed in accordance with the invention.

Referring to the drawings and particularly to FIG. 1, an arc welding circuit is shown including a pair of direct current (D.C.) output or welding terminals 1 which are interconnected respectively to a metal work member 2 and a consumable electrode 3. The D.C. terminals 1 are parallel connected to a relatively low level D.C. power supply 4 in series with a blocking diode 5 and to a high level D.C. power supply 6 in series with a silicon controlled rectifier 7. The D.C. power supplies 4 and 6 are connected with the corresponding positive sides connected to the positive output terminal 1 which is connected to the consumable electrode 3 and the negative sides of the supplies connected to a negative terminal 1 which is connected to the work member 2, in the illustrated embodiment of the invention. A trigger control circuit 8 is provided to provide controlled firing of the silicon controlled rectifier 7 which in turn will control the application of the high voltage from supply 6 across the terminals 1 and thus across the work 2 and the electrode 3. A commutating silicon controlled rectifier 9 is connected in series with a commutating capacitor 10 directly across the anode to cathode circuit of the silicon controlled rectifier 7. The controlled rectifier 9 is fired from a commutating trigger circuit 11 and thereby controls the impressing of the charge on the capacitor 10 across the rectifier 7 for turning off such rectifier 9. The capacitor 10 is interconnected to D.C. commutating power circuit 12 to charge the capacitor 10 to the illustrated polarity.

The operation of the circuit may be briefly summarized as follows before a more particular description of the illustrated circuit is given.

The supply 6 has a sufficiently high voltage to establish and maintain the arc 13 with substantial metal transfer from the electrode 3 to the work 2. The output of the supply 4 is only sufficient to maintain the arc 13 between the work 2 and the consumable electrode 3 but is insufficient to establish such arc. In operation, the trigger circuit 8 is actuated to fire and turn on the controlled rectifier 7 thereby providing a high voltage across the arc welding terminals 1. This creates arc 13 with a substantial metal transfer from the electrode 3 to the work 2. When it is desired to terminate the substantial metal transfer but to maintain a lesser powered arc, the commutating controlled rectifier 9 is fired by suitable pulse from the trigger circuit 12. The charge on capacitor 10 back biases the main silicon controlled rectifier 7 which rapidly reverts to the normal blocking state, thereby opening the high voltage supply connection. Between the firing of the main silicon controlled rectifier 7, the commutating capacitor 10 is charged to permit rapid turn off of the rectifier.

Thus by controlled firing of the rectifiers 7 and 9, a high voltage pulse of a selected duration and rate is superimposed on the background voltage maintained by the low level D.C. power supply 4.

More particularly, in the illustrated embodiment of the invention, the D.C. supplies 4 and 6 are interconnected by a three phase transformer 14 to a set of three phase A.C. supply lines 15. The transformer 14 includes a primary 16 shown in a star connection with the several phase windings of the primary similarly tapped as at 17 to permit varying of the turns of the primary winding 16 and thereby the turns ratio with respect to a pair of secondaries 18 and 19. The secondary 18 forms a part of the supply 4 while the secondary 19 forms a part of the supply 6. Each of the secondaries 18 and 19 is shown connected in a delta configuration and each is similarly wound to provide inphase output voltages. The secondary 19 is wound with a substantially greater number of turns relative to secondary 18 and establishes a correspondingly greater voltage. A full-wave diode rectifier bridge circuit 20 with the indicated plurality is connected across the secondary winding 18 and a similar rectifier bridge circuit 21 is connected across secondary winding 19, with the outputs of rectifier circuits 20 and 21 connected to terminals 1 in series with diode 5 and rectifier 7 respectively.

Silicon controlled rectifier 7 includes an anode 22 and cathode 23 with the anode to cathode circuit connected in series between the positive side of the diode bridge rectifier circuit 20 and the corresponding positive welding terminal 1. The rectifier 7 further includes a gate 24 with the gate to cathode circuit of the silicon controlled rectifier 7 connected to trigger 8 to provide controlled firing thereof in accordance with well known operation of controlled rectifiers. The trigger circuit 8 is shown in block diagram and may be of any known or desired pulse generating circuit which is adapted to establish a train of pulse signals and which includes a suitable means 25 for varying the pulse repetition rate. For example the circuit may be any one of the well known unijunction transistor pulse circuits. When a pulse gate signal is applied to the gate 24, the controlled rectifier 7 conducts and continues to conduct independently of the gate signal as a result of the continuous application of the positive polarity of the bridge circuit 20 to the anode 22 until such time as the current through the rectifier 7 is reduced below its holding current. This is accomplished by impressing the voltage capacitor 10 through the controlled rectifier 9 across the anode to cathode circuit of the rectifier 7.

The controlled rectifier 9 similarly includes an anode 26, cathode 27 and gate 28. The anode 26 is connected to the positive side of the capacitor 10 and the cathode 27 is connected to the cathode 23 of the rectifier 7. The gate 28 is connected to the commutating trigger circuit 11 which may be similar to circuit 8 and establishes a train of signal pulses intermeshed with the turn-on pulses of circuit 8, as hereinafter described. A rate control means 29 provides for varying of the repetition rate of the pulses from circuit 11.

The capacitor 10 is connected to a pair of incoming power supply lines 13 by a single phase transformer 30 and full wave diode bridge circuit 31. A resistor 32 is connected in parallel with the output of D.C. bridge circuit 31 and a series resistor 33 is connected between circuit 31 and the capacitor 10.

Figure 2:
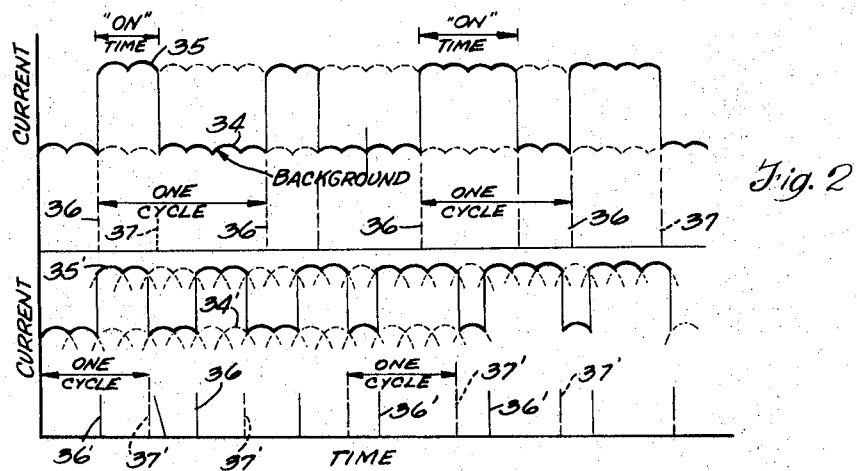
FIG. 2 is a graphical illustration showing a pair of current traces with various pulse rates and pulse widths obtainable from the circuit illustrated in FIG. 1.

The operation of the illustrated embodiment of the invention is more fully described with regard to the output currents, as diagrammatically shown in FIG. 2 in which a pair of current traces are illustrated on a common time scale along the horizontal axis to illustrate the variable control provided by the present invention. Referring to the first or uppermost trace in FIG. 2, a three phase full wave rectified background level current trace 34 is shown of a selected amplitude. The background current includes a ripple frequency of 360 hertz. This is the current supplied by the three phase secondary 18 and rectified by the rectifier bridge circuit 20 through the blocking diode 5. In FIG. 2, the current supplied to the arc is shown in full line illustration with portion of the blocked current shown in dotted illustration for clarity of illustration. A similar trace 35 illustrates the similar rectified current supplied by secondary 19 and rectifier circuit 21. A train of turn-on pulses 36 having a frequency of 60 pulses per second (p.p.s.), are shown in full line illustration by vertical pulse line 36 disposed in time spaced relation and in phase with the crossover point in the ripple frequency of the traces 34 and 35 in the illustrated embodiment. The 60 p.p.s. thus produce a pulse cycle encompassing 6 of the convolutions of the 360 hertz ripple. Each pulse 36 is applied to the gate 24 of the silicon controlled rectifier 7 and biases it to conduct. When the rectifier 7 turns on, the higher level voltage is applied across the output terminals 1 and the current immediately rises as shown by the full line portion of trace 35. A second signal pulse train of a frequency of 60 pulses per second shown by the dash vertical lines 37, are formed by the pulse commutating trigger circuit 11 and are applied to the gate 28 of the commutating controlled rectifier 9. The pulse signals 37 fire rectifier 9 to apply the capacitor 10 across and back bias the rectifier 7 and thereby terminate the conduction through rectifier 7 and remove the direct current power supply 6 whereupon the arc voltage is reduced to the background level and the current correspondingly drops.

During the "off" time or the low voltage dwell between pulses, the arc 13 is maintained with essentially no metal transfer from the electrode 3. Although the arc length will be reduced as a result of the electrode feed, the dwell period is insufficient to permit short circuiting of the arc. Thus, a continuous arc 13 is maintained with the metal transfer essentially restricted to the period of conduction of the controlled rectifier 7 by the controlled sequential firing of rectifiers 7 and 9.

In actual practice, the welding system will normally provide a means for controlled feeding of the consumable electrode 3 toward the work member 2, shielding gas or other arc modifying material and the like. As such detail will be understood by those skilled in the art and are not necessary to a clear and complete understanding of the means of the present invention, they have not been shown and are not otherwise described.

The third and fourth turn off pulses 37 for triggering of the commutating control rectifier 9 are shown delayed to the very end of eacsh cycle such that with the same pulse rate, the latter portion of the trace includes an "on" time or welding pulse width which is twice that of the first portion. The average current for the second portion will, therefore, be greater than that of the first even though the frequency and amplitude of both the pulse current and the background current is the same.

Conversely, if desired, the pulse "on" time may be controlled by maintaining a fixed commutating pulse train 37 and varying the turn-on pulse train 36.

A second trace shown on the same time scale as that just described illustrates increasing of the pulse rates to 90 pulses per second. Corresponding primed numbers are employed in the second trace for reference purposes. With a pulse rate of 90 p.p.s., each cycle covers four convolutions of the 360 hertz ripple in contrast to the six per cycle with 60 p.p.s. In the initial portion of the second trace, the pulse trains 36' and 37' are established to produce an "on" time or pulse width equal to 50% of each cycle. In the latter portion of the trade, the "on" time is increased to approximately 75% of the cycle by phasing back of the pulse train 36' while maintaining the constant pulse rate.

In comparing the traces, the first portion of the second trace produces a greater average current than that of the first portion of the first trace even though the "on" time is essentially the same because the pulse rate has been increased. The average current for the final portion of the second trace is even greater because the "on" time has been further increased.

Generally, the condition illustrated by the first portion of the first trace is suited for welding of thin plates or tubing in a vertical or overhead position where movement of the weld metal is a problem. The average current of the pulses provides the desired transfer of weld metal with the substantial weld time between the pulses providing a highly desirable cooling period which will prevent burn through and maintain excellent weld puddle control. The condition of the final portion of the second trace is more suitable to the welding of metal in a horizontal position because of the high average current which creates a high heat input and transfer of metal to the weld.

Applicant has found that as a practical matter in the circuit shown in FIG. 1, the pulse rate is preferably not reduced below 15 pulses per second because the arc characteristic appears to include an aggravating flicker and an actual lack of fusion as a result of excessive cooling of the weld metal. Conversely, if the pulse rate is above 100 pulses per second, the metal transfer from the electrode is essentially a continuous spray type transfer such that the pulse control is completely ineffective. For similar reasons, the "on" time is generally limited to between 15% and 90% of each cycle.

The taps 17 of the transformer primary 16 permit variations in the amplitude of the background voltage and the pulse voltage.

The illustrated welding circuit provides a variable pulse and background voltage combination means to vary the pulse rate and the pulse width and thus provide a very versatile means of varying of the arc characteristics to meet various external arc requirements. The consumable electrode wire is normally available in diameters of 0.030 inch, 0.035 inch and 0.045 inch as well as $\frac{1}{16}$ and $\frac{1}{32}$ inch, and each of these wires is preferably energized at a particular pulse rate and pulse width which may also vary with the particular pulse background and voltage amplitude.

Various modes of carrying out the invention are contemplated as being within the scope of the following claims particularly pointing out and distinctly claiming the subject matter which is regarded as the invention.

I claim:

1. An arc welding establishing power supply circuit comprising a pair of direct current welding terminal means for establishing and maintaining a welding arc between an electrode and a work unit connected to said terminal means, a first direct current power supply having a three phase full wave rectifying circuit with output means connected to said direct current terminal means, a second direct current power supply having a three phase full wave rectifying circuit with output means connected to said direct current terminal means and constructed to provide an output of greater magnitude than said first power supply, a common input transformer to said first and said second direct current power supplies and having a primary winding and individual secondary windings correspondingly connected one each to each of said rectifying circuits, said secondaries being in phase and having different number of turns to establish in phase currents and voltages to said rectifying circuits, the connection of said rectifying circuits to said terminals corresponding to maintain the in phase relationship of the current and voltage, a first switching means connected between the output means of the second power supply and said direct current terminal means to selectively impress the output of said second power supply across said terminals in phase with the output of the first power supply, said switching means being constructed to close and remain closed in response to a pulse signal, a first pulse means connected to said switching means to periodically and repetitively apply a closing pulse signal to said switching means to close the switching means, a turn-off second means connected to said switching means periodically and repetitively actuated to selectively open the switching means and operable independently of said first and second power supply, and adjustment means connected with said primary winding to simultaneously vary the effective power supplied from the primary to secondaries and thereby establish corresponding change in the amplitude of the current and voltage while maintaining said in phase relationship of the current and voltage.

2. The arc welding supply of claim 1 wherein said controlled switching means is a controlled rectifier connected between said second power supply and said terminal means, and having a gate, said pulse means connected to the gate and to generating a series of time spaced turn-on pulses applied to said gate, and said turn-off means including a commutating capacitor and a controlled rectifier connected across said first named controlled rectifier, a single phase transformer connected to one phase of said primary winding, a full wave bridge rectifier connected to said single phase transformer and said commutating capacitor to supply power thereto, said second controlled rectifier having a gate and said second means including means to generate a series of time spaced turn-off pulses applied to said gate of said second controlled rectifier.

References Cited

UNITED STATES PATENTS

| | | | |
|---|---|---|---|
| 3,339,107 | 8/1967 | Aldenhoff | 219—131 |
| 3,071,680 | 1/1963 | Anderson et al. | 219—131 |
| 3,249,735 | 5/1966 | Needham | 219—131 |
| 3,355,654 | 11/1967 | Risberg | 321—44 |
| 3,423,564 | 1/1969 | Sevenco | 219—131 |

J. V. TRUHE, Primary Examiner

J. G. SMITH, Assistant Examiner